No. 757,882. PATENTED APR. 19, 1904.
T. C. BUTTERWORTH.
HITCHING POST.
APPLICATION FILED NOV. 10, 1903.
NO MODEL. 2 SHEETS—SHEET 1.
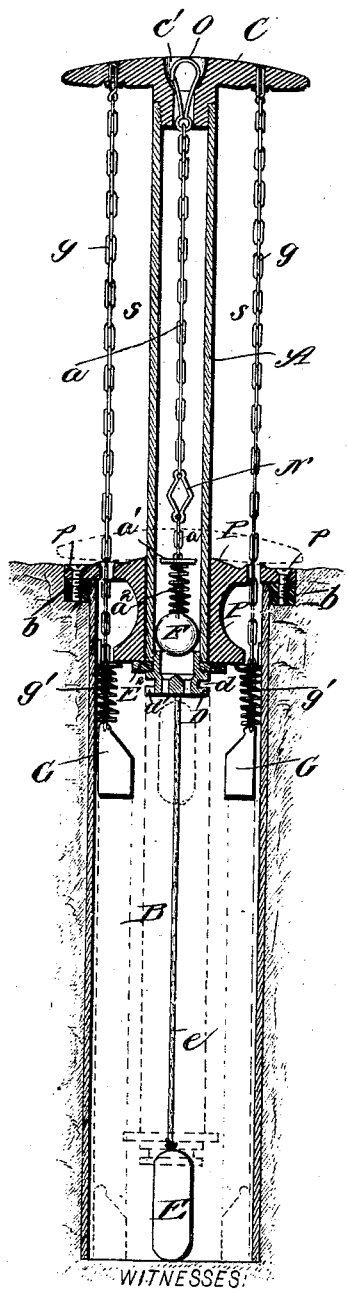
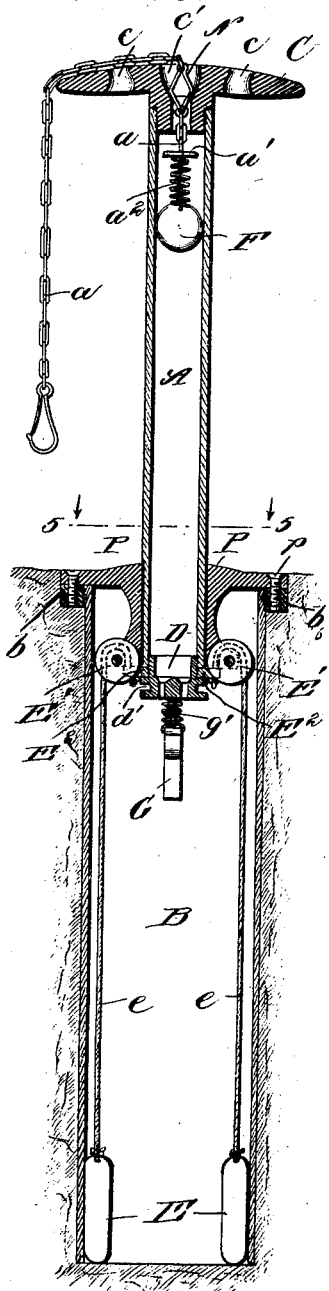
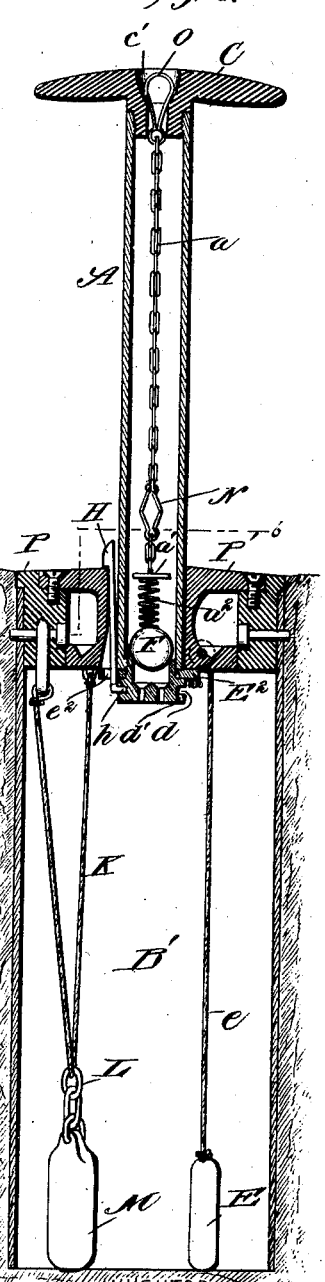
WITNESSES: INVENTOR
Thomas C. Butterworth
BY Munn & Co.
ATTORNEYS.

No. 757,882. PATENTED APR. 19, 1904.
T. C. BUTTERWORTH.
HITCHING POST.
APPLICATION FILED NOV. 10, 1903.
NO MODEL. 2 SHEETS—SHEET 2.
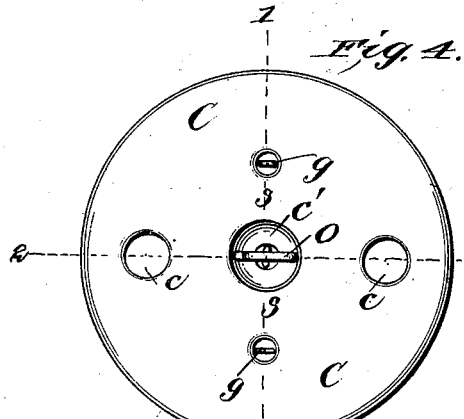
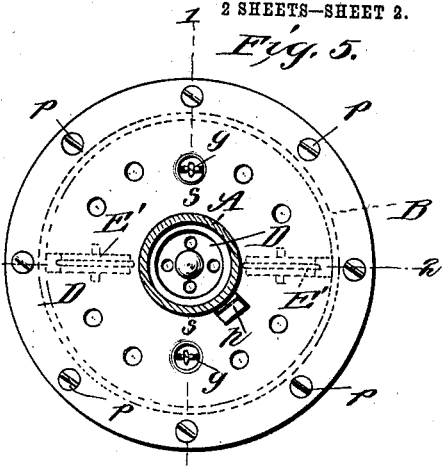
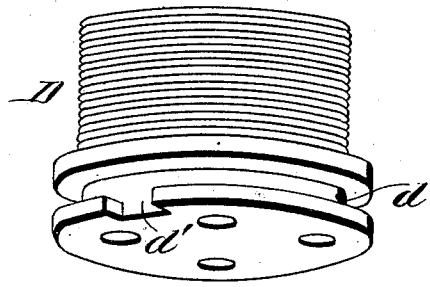
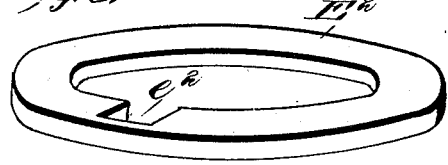
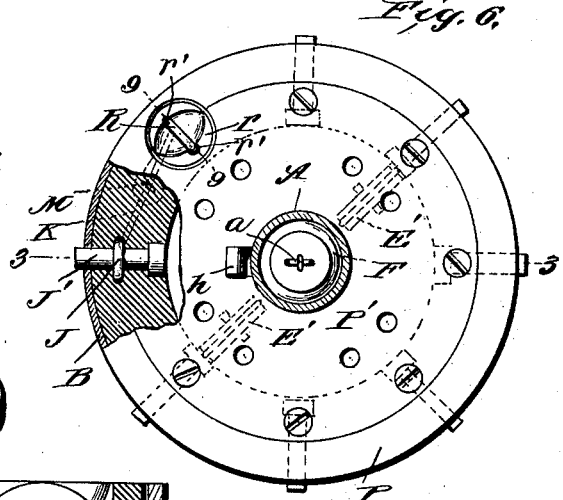
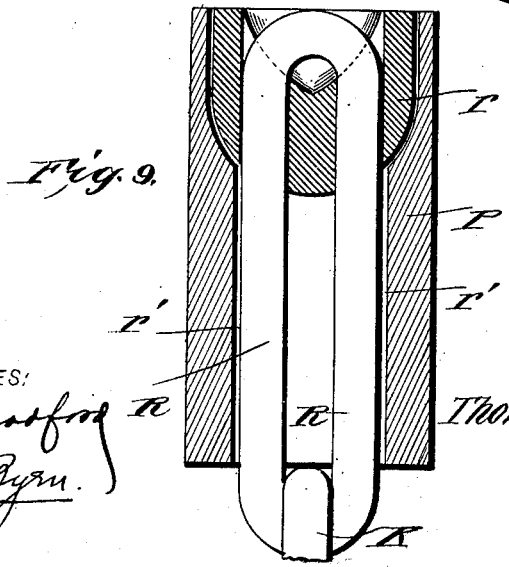
WITNESSES:
INVENTOR
Thomas C. Butterworth.
BY
ATTORNEYS.

No. 757,882.

Patented April 19, 1904.

UNITED STATES PATENT OFFICE.

THOMAS CHARLES BUTTERWORTH, OF SAN FRANCISCO, CALIFORNIA.

HITCHING-POST.

SPECIFICATION forming part of Letters Patent No. 757,882, dated April 19, 1904.

Application filed November 10, 1903. Serial No. 180,550. (No model.)

*To all whom it may concern:*

Be it known that I, THOMAS CHARLES BUTTERWORTH, a citizen of the United States, residing at San Francisco, in the county of San Francisco and State of California, have invented a new and useful Improvement in Hitching-Posts, of which the following is a specification.

My invention is in the nature of a hitching-post which when not in use will be nearly flush with the surface of the pavement, so as to involve no obstruction or menace to traffic or possible injury to itself, but which may be conveniently lifted and erected by a telescopic action from an underground chamber to a suitable altitude to serve its purpose for the hitching of teams or automobiles or the support of bicycles, the parts being so designed as to avoid any considerable leakage of water and the danger of freezing up and from which foreign matter may be easily removed and repairs conveniently made.

My invention consists in the novel construction and arrangement of parts, which I will now proceed to describe with reference to the drawings, in which—

Figure 1 is a vertical central section in the plane indicated by the line 1 1 of Figs. 4 and 5; Fig. 2, a similar view in the plane indicated by line 2 2 of Figs. 4 and 5; Fig. 3, a similar view in the plane indicated by line 3 3 of Fig. 6. Fig. 4 is a plan view of the cap C. Fig. 5 is a horizontal section on line 5 5 of Fig. 2. Fig. 6 is a horizontal section on line 6 6 of Fig. 3, the plate P' being broken away. Fig. 7 is a perspective view of the plug at the lower end of the telescopic post. Fig. 8 is a detail perspective view of a ring at the lower end of the hitching-post, and Fig. 9 is an enlarged sectional detail on line 9 9 of Fig. 6.

In the drawings, Figs. 1 and 2, A represents a tubular metal column which has detachably screwed into its upper end an overhanging cap C. This column constitutes the hitching-post proper and is vertically extensible in a telescopic way within a metal casing buried in the ground. This casing consists of a cylinder B, surmounted by a plate P, which is detachably secured to the casing by a ring $b$ and screws $p$. The cap C is made of equal width to and overhangs the plate P, so as to protect it from the weather, and has holes $c$, which serve as handholds to raise the cap by and also as fastening-points for hitching-straps. The plate P sits flush, or nearly so, with the surface of the pavement, and the cap C when in its lowest position rests upon said plate, as shown in dotted lines in Fig. 1. The post A and its surmounting cap are operated upon by weights, one set of which serve to elevate the post and the other set of which, in connection with chains, serve as bicycle-holders. These latter weights are shown at G G in Fig. 1, which are connected by chains $g$ to the cap, the lower portions of these chains being provided with coil-springs $g'$, which when the post and cap are raised to the full height take up against the lower surface of the plate P and break the jar or shock and also hold the chains under tension when the post is lifted to its full height. These weights also act as sinkers to maintain a tension on the chains at all times and insure their return through the holes into the casing below, thus avoiding all doubling up of the chains in lowering the post. The weights which tend to raise the post are shown at E E in Fig. 2. These are connected to wire cables $e\ e$, which pass over pulleys E', journaled in bearings in the plate P, and thence extend downwardly and are fastened to the lower part of the post by special attachment. This attachment consists of a ring $E^2$, to which the cables are fastened, while the ring is clamped between the lower end of post A and a shoulder on a screw-threaded plug D, which is turned into the lower end of the post. This plug has holes through it to allow the escape of dirt or water.

In the center of the cap C there is a hole through it, terminating on the upper side in a countersunk seat $c'$. Through this hole there passes in and out from the hollow post A a hitching-chain $a$, (see Figs. 1, 2, 3,) having at its upper end a clasp or snap-hook O, adapted to be fastened into the bridle-ring of the team and at its lower end connected to a weight F within the hollow post, which tends to draw the chain back into the hollow post. The lower end of the chain is encircled by a coil-spring $a^2$, which when the chain is drawn out to its fullest extent takes up against the plate P and cushions or breaks the jar. When in its lowest position, the snap-hook O rests in the seat $c'$ and is out of the way of street traffic and is protected as against damage to itself. At an intermediate point in the chain $a$ is located an expansible spring-link N. (See Fig. 2.) This spring-link is a little larger in cross-section than the hole in the plate, but by the application of force may be drawn through the same, so as to rest in the seat $c'$ above the plate and support the weight F in elevated position, so that the bridle of the team is relieved of the constant dragging strain of the weight E. This spring-link is so located in the chain that it holds the weight suspended when the halter-chain is withdrawn from the post. To return the halter-chain and spring-link into the post again, the halter-chain is slightly lifted and dropped, whereby the impetus of the weight F will elongate and partially collapse the spring-link N and by thus reducing its transverse dimensions will drag it down through the cap again and draw the full length of the halter-chain into the post, leaving the snap-hook O in the seat $c'$, as shown in Fig. 1.

To hold the hitching-post in its elevated position when in use, there is attached to the lower end of the hitching-post a spring-catch H, (see Fig. 3,) having a hook on its upper end, which passes through a vertical channel in the plate P and springs over the top of said plate as soon as the hooked end rises above it. To lower the post, this hooked catch is simply kicked into the range of its channel again, and the weight of the post and cap and the attached weights G bring the post down. The aggregate weight of the post, cap, and weights G G is so apportioned to the balance-weights E E that the post rides easily down or easily up in response to a very slight pressure. To facilitate the connection of the spring-catch H, its lower end is bent inwardly at $h$, (see Fig. 3,) and is made to enter an inlet $d'$ to a circular groove $d$ in the plug D. The lower end of the spring-catch is first passed through a hole $e^2$ in the ring $E^2$ and is then lifted through the inlet $d'$ into the groove $d$, and then when plug D is turned to clamp the ring $E^2$ in place the bent end $h$ of the spring-catch swivels in the circular groove $d$ of the plug, which, together with the ring $E^2$, hold the spring-catch H in place without any other fastening.

In connection with the hitching-post, as thus described, I have provided an automobile-hitching attachment. (See Figs. 3, 6, and 9.) In the upper surface of plate P is formed near its outer edge a countersink with two holes $r'$ $r'$ going through it. In these two holes slide the shanks of a long link R, which at its upper end has a concave washer $r$ permanently attached thereto. This concave washer seats itself in the countersink of the plate, as seen in Fig. 9, and the lower end of the long link is attached to a cable K, which roves through a ring L, attached to a weight M in the lower part of the casing. The other end of the cable rises from the ring L to the plate P and has a permanent anchorage to a link J, secured in the plate P by a bolt J'. When the link R and washer $r$ are pulled up, the cable K may be extended a suitable distance to attach to the automobile, the cable K sliding through the ring L and raising the weight M. If desired, a pulley may be used in the place of the ring L. The upper end of the long link R and washer $r$ lie in the countersink below the level of the plate P; but the link R extends far enough above the hollow of the concave washer $r$ to be grasped by the fingers to raise it. The concave washer $r$ acts as an anchorage to the end of the automobile-halter to prevent the latter from dropping entirely into the casing.

Referring to Fig. 1, it will be seen that when cap C is in its elevated position the chains $g$ $g$ occupy parallel positions on each side of the elevated post and are under the tension of springs $g'$, and the spaces $s$ between them and the post form convenient pockets or vertical openings to hold the wheels of two bicycles between the chains and the post. These chains or vertically-extensible connections being offset from the post on each side serve also to form stiffening or steadying devices for the post (when elevated) against lateral deflection due to a lateral pull of the team.

In defining my invention with greater clearness I would state that I am aware that a hollow vertically-adjustable and telescopically-sliding hitching-post has been heretofore designed so as to pass down into the ground or be drawn up above the surface and that such sliding post has been provided with pulleys and balance-weights. I am also aware that a weighted halter-chain has been arranged with such hollow post, and, further, that a spring-catch has been used to hold the post up, and I make no claim, broadly, to these features.

Having thus described my invention, what I claim as new, and desire to secure by Letters Patent, is—

1. A hitching-post comprising an underground casing with a surface plate having a central opening and also holes on each side of the central opening, a vertically-extensible post passing through the central hole, chains or cables attached at their upper ends to the extensible post and spaced a distance from the post and passing through the holes in the surface plate and sinker-weights attached to the lower ends of the chains within the casing to maintain said chains under tension and positively return them through the holes into the casing below substantially as and for the purpose described.

2. In a hitching-post of the kind described, the combination with the hollow post; of a cap mounted on the post and having a hole in the center, a weighted halter-chain passing through said hole, said chain having in its length an expansible spring-link adapted to be elongated so as to be drawn through said hole and to expand above the hole to hold the weight of the halter-chain suspended without tension on the portion of the halter-chain above the cap substantially as described.

3. In a hitching-post of the kind described, the combination with the hollow and vertically-extensible post and its casing having a surface plate at the top; of a cap mounted on the top of said post and extending completely over the surface plate and having a central hole through it, said cap being arranged concentrically above the surface plate, and a weighted halter-chain passing through the cap substantially as shown and described.

4. In a hitching-post of the kind described, the combination of a vertically-extensible hitching-post having a surmounting and overhanging cap, a casing for the post having a surface plate, and one or more chains connected to the overhang of the cap and extending through the surface plate of the casing in parallel position to the post to form therewith bicycle-holders as described.

5. In a hitching-post of the kind described, the combination of a vertically-extensible hitching-post having a surmounting and overhanging cap, a casing for the post having a surface plate, one or more chains connected to the overhang of the cap and extending through the surface plate and provided at the lower end with means for maintaining the chains under tension when the post is raised substantially as described.

6. In a hitching-post of the kind described, the combination of a vertically-extensible post having a surmounting and overhanging cap, and a vertically-extensible device attached to the overhanging cap and extending parallel to the post and at a distance therefrom into and out from the earth, whereby the post is maintained in steady upright position substantially as described.

7. In a hitching-post of the kind described, the combination of a vertically-extensible hitching-post having a surmounting and overhanging cap, a casing for the post having a surface plate, a chain attached to the overhang of the cap and passing through the surface plate, a weight for the lower end of the chain and a buffer-spring arranged above the weight substantially as shown and described.

8. In a hitching-post of the kind described, the combination with the vertically-extensible post of two oppositely-acting sets of weights, one being provided with cushion-springs to form elastic stops to the upward movement of the post, and the other being connected to the post through cords and pulleys and arranged to lift the post up, substantially as and for the purpose described.

9. In a hitching-post of the kind described, the combination with a vertically-channeled surface plate and a vertically-extensible post moving through the plate; of an upright spring-catch arranged on the outer side of the post and moving through the channel of the surface plate and having a freely-moving upper end adapted to lock over the surface plate to hold the post in elevated position, and means for detachably securing the lower end of the catch to the lower end of the post substantially as described.

10. In a hitching-post of the kind described, the combination with a surface plate and a vertically-extensible post moving through the plate; of a locking-catch arranged on the outside of the post and having its lower end bent inwardly, a screw-plug for the lower end of the post having a circular groove with inlet-opening to receive the inturned end of the spring-catch, and a ring having a hole to receive the lower end of the spring-catch and arranged to be clamped between the screw-plug and the lower end of the post substantially as described.

THOMAS CHARLES BUTTERWORTH.

Witnesses:
 JAMES L. FENNELL,
 M. C. LYNCH.